United States Patent [19]

Warner

[11] Patent Number: 4,792,267
[45] Date of Patent: Dec. 20, 1988

[54] CARRIAGE FOR A MACHINE TOOL

[75] Inventor: Robert J. Warner, Waukesha County, Wis.

[73] Assignee: Kearney & Trecker Corporation, West Allis, Wis.

[21] Appl. No.: 12,686

[22] Filed: Feb. 9, 1987

[51] Int. Cl.⁴ .......................... B23C 1/00; B23B 39/02
[52] U.S. Cl. ........................................ 409/235; 82/32; 384/9; 384/42; 408/234
[58] Field of Search ................ 82/30, 32; 408/234; 409/235, 238, 239, 241; 384/79, 26, 42

[56] References Cited

U.S. PATENT DOCUMENTS

| | | | |
|---|---|---|---|
| 2,092,587 | 9/1937 | Olson | 82/32 |
| 2,167,609 | 7/1939 | Dolle | 82/32 |
| 2,450,972 | 10/1948 | LeFourneau | 82/32 |
| 2,571,043 | 10/1951 | Lange | 82/32 |
| 2,612,986 | 10/1952 | Lomazzo | 82/32 |
| 2,719,761 | 10/1955 | Bonnafe | 82/32 |
| 2,979,971 | 4/1961 | Darash | 74/820 |
| 3,316,784 | 5/1967 | Johnson et al. | 82/24 |
| 3,372,613 | 3/1968 | Feld | 82/32 |
| 3,534,643 | 10/1970 | Markgraf | 82/32 |
| 3,750,245 | 8/1973 | Kennedy et al. | 82/24 |
| 4,062,256 | 12/1977 | Newman, Jr. et al. | 82/17 |
| 4,229,866 | 10/1980 | Berthier | 409/235 |
| 4,632,615 | 12/1986 | Yamamura | 409/235 |
| 4,700,442 | 10/1987 | Lahm | 29/39 |

FOREIGN PATENT DOCUMENTS 562452 12/1957 Belgium ........................... 82/32

*Primary Examiner*—Gil Weidenfeld
*Assistant Examiner*—Daniel W. Howell
*Attorney, Agent, or Firm*—James O. Skarsten

[57] ABSTRACT

A carriage for a machine tool includes ways (16) and (18), a base (14) supporting the ways and a saddle (20) supported by bearings (22) and (24) for movement along the ways to carry a column (26) along the X-axis of the machine tool. The load bearing surface (16a) of way (16) is located at a higher level above machine tool support surface (16a) than the load bearing surface (18a) of way (18). Thrust directed against column (26) in the course of a machining operation is transmitted to saddle (20) through Z-axis ways 40 and way bearings (42), and is transmitted from saddle (20) to thrust bearing surface (16c) of way (16).

13 Claims, 2 Drawing Sheets

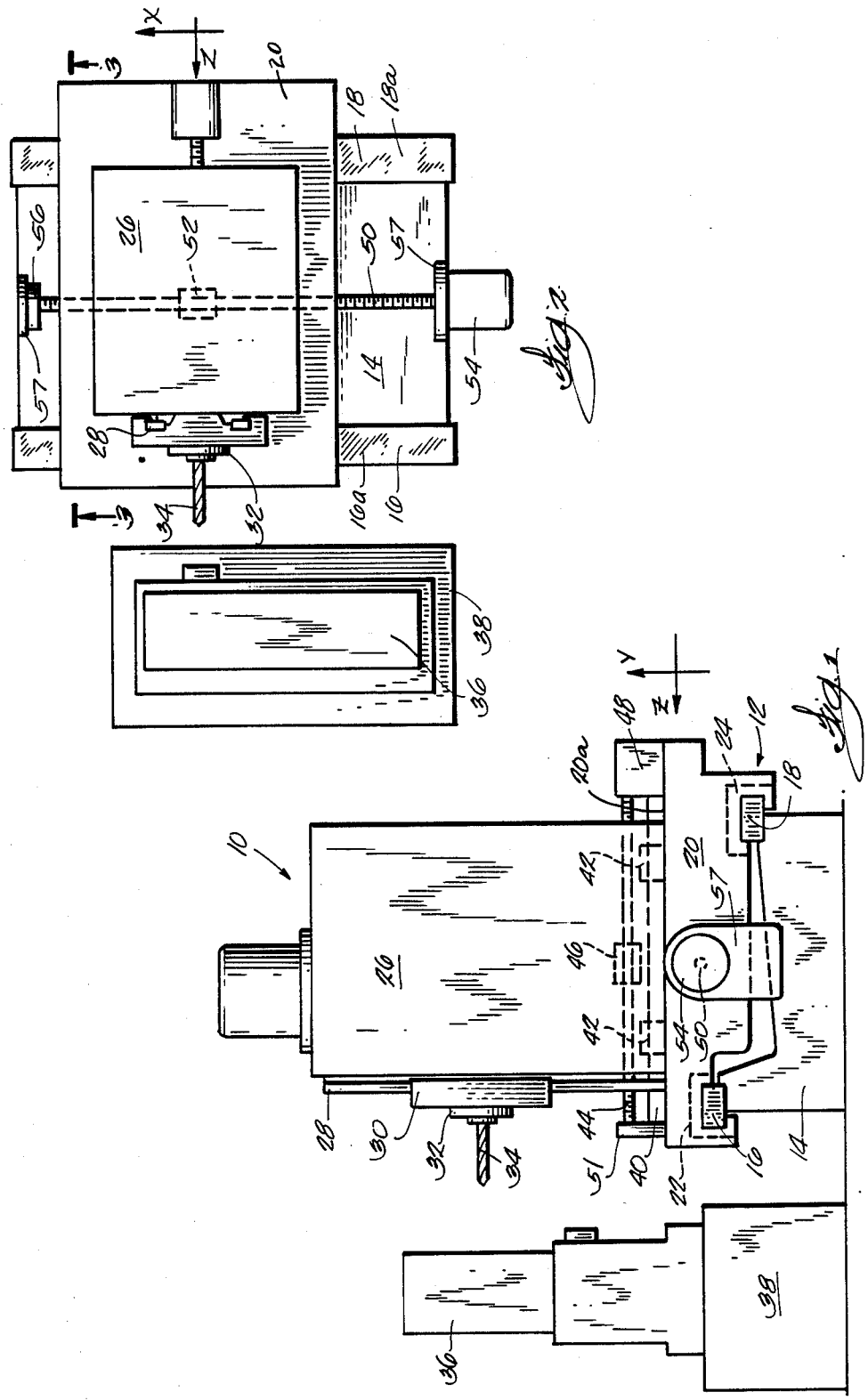

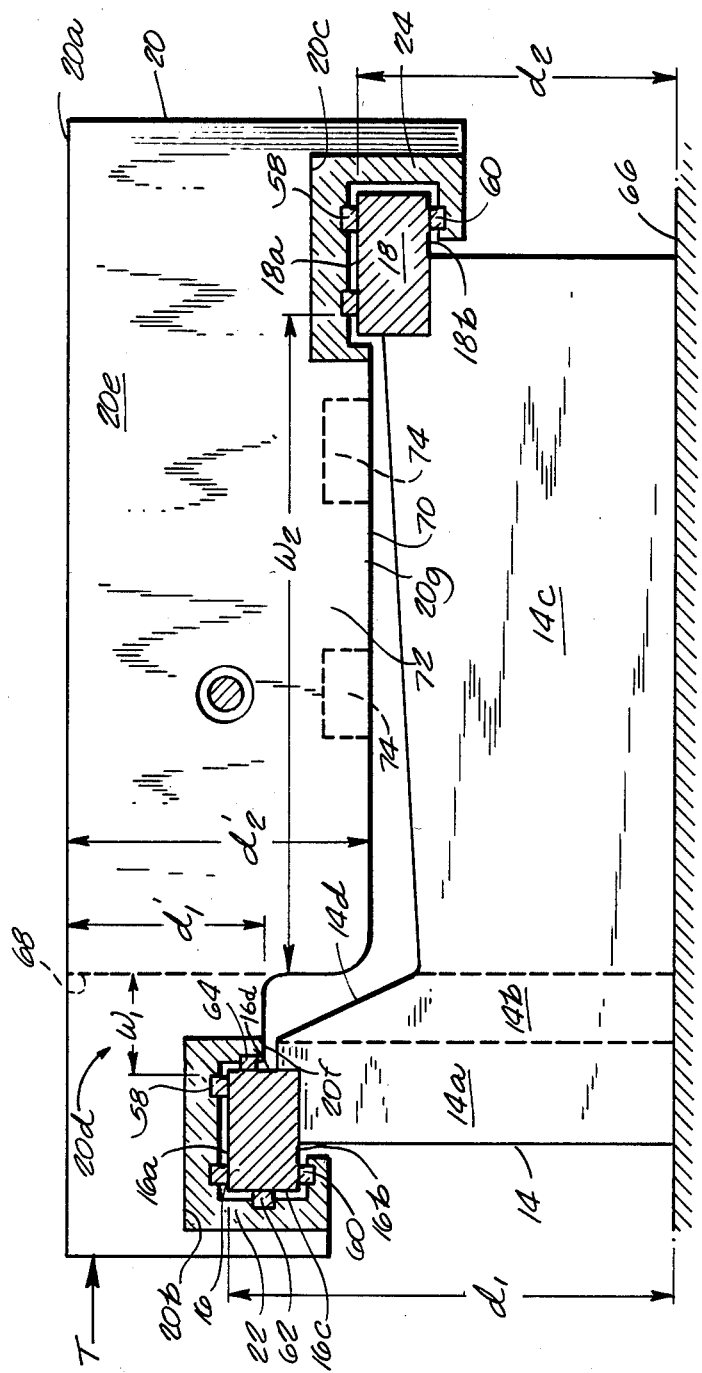

CARRIAGE FOR A MACHINE TOOL

BACKGROUND OF THE INVENTION

The invention pertains to a carriage for a machine tool.

In a machine tool such as a traveling column machining center or milling machine, a column supporting a rotary spindle is carried upon a cross-slide or saddle. Movement of the column along an axis is guided by means of ways mounted on the saddle. The saddle is guided along another axis, orthogonal to the first axis, by means of ways mounted upon a base or bed. Typically, the base is in contact with the floor of a work area, or like solid horizontal surface.

In a common configuration, the saddle is movably supported upon way bearing surfaces which lie in a common horizontal plane. The base has an effective depth comprising the distance between such plane and the floor supporting the base, and the saddle has an effective depth comprising the distance between the plane and the upper surface of the saddle, adjacent to the column. The distance between the floor and upper surface of the saddle, referred to as the "stacking height", is thus substantially the sum of the base depth and the saddle depth. Generally, the thrust resisting capability of a machine tool, that is, its ability to solidly take up thrust forces generated in the course of machining, increases as the base depth increases. On the other hand, the rigidity or stiffness of the saddle, and therefore its load carrying capability, is increased by increasing saddle depth.

In designing traveling column machines of the above type, and particularly large-size machines, the maximum acceptable level of stacking height will tend to be limited by certain practical considerations. For example, it could become awkward for an average size operator to perform certain tasks at a level above the stacking height, if the stacking height was higher than his shoulders. However, if a maximum limit is placed upon the stacking height, the depth of the base cannot be increased, to enhance thrust resisting capability, without correspondingly reducing the depth of the saddle. As saddle depth is decreased, reducing the stiffness thereof, downward deflection of the spindle becomes an increasingly serious problem, particularly when the column supporting the spindle is positioned midway between the ways supporting the saddle. In some designs, it is necessary to use three ways to support the saddle rather than just two, to prevent an unacceptable level of spindle deflection. Conversely, increasing saddle depth in a design requiring fixed stacking height correspondingly reduces base depth, and therefore thrust resisting capability.

SUMMARY OF THE INVENTION

A carriage is provided for a machine tool having a work performing member. The carriage generally comprises first and second ways, each having a planar load bearing surface; a base supporting the ways so that they are aligned along an axis, and their load bearing surfaces are horizontally aligned: a saddle carrying the work performing member positioned on the first and second ways; means for transmitting thrust forces directed against the member in the course of machining operations to the saddle; first bearing means for transmitting the weight of the saddle and member to the ways; second bearing means for constraining the saddle to movement along the axis; and means for attaching the first and second bearing means to the saddle. The base is configured to maintain the load bearing surfaces of the first and second ways at first and second levels, respectively, above a generally horizontal surface supporting the machine tool, the first level being greater than the second level. The first bearing means comprises means for transmitting a substantial portion of the combined weight of the saddle and member to the load bearing surfaces of each of the ways. The second bearing means includes means for transmitting substantially all of the thrust forces received by the saddle to the first way.

An advantage of the invention lies in providing a machine tool carriage having a base and a saddle which enable both the thrust resisting capability of the base and the load carrying capability of the saddle to be optimized, without the need to excesssively increase the stacking height of the carriage.

Another advantage lies in providing a traveling column machining center of the above type which does not require more than two ways to support the saddle and column for movement along a large-size workpiece.

These and other advantages will become more readily apparent from the ensuing Detailed Description of the Preferred Embodiment, taken together with the Drawings.

BRIEF DESCRIPTION OF THE DRAWINGS

FIG. 1 is a side view of a traveling column machining center which includes an embodiment of the invention.

FIG. 2 is an overhead view of the embodiment of FIG. 1.

FIG. 3 is a sectional view taken along lines 3—3 of FIG. 2.

DETAILED DESCRIPTION OF THE PREFERRED EMBODIMENT

FIG. 1 shows a traveling column machining center 10 having a carriage structure 12 generally comprising a base 14; forward and rearward ways 16 and 18 rigidly joined to the base 14 in parallel relationship with each other along the X-axis of the machining center 10; a saddle 20; and bearing packages 22 and 24 secured to the saddle 20 for mounting the saddle for linear movement along the ways 16 and 18, and thereby along the X-axis. The bearing packages also operate to constrain the saddle against any other movement.

The machining center 10 is further provided with a column 26 movably carried upon a generally horizontal upper surface 20a of saddle 20. Vertical ways 28 are secured to column 26, to guide the vertical or Y-axis movement of a spindle head 30, which is supported by column 26 in a conventional manner. A spindle 32 journaled in the spindle head 30 engages a cutting tool 34, and is rotatably driven to perform machining operations upon a workpiece 36 supported upon a table 38. Tool 34 is brought into engagement with the workpiece 36 by moving the column 26 relative to the saddle 20 and along the Z-axis of the machining center 10, i.e., in a direction orthogonal to the X and Y-axes. The Z-axis movement of column 26 is guided by means of ways 40, rigidly joined to the upper surface 20a of saddle 20, and conventional way bearing packages 42, joined to the column and in engagement with the ways 40. The column is moved along the Z-axis by means of a ball screw 44 and a complementary ball nut 46 attached to the column and engaging the ball screw 44. Ball screw 44 is aligned along the Z-axis and rotatably supported between a motor 48 and bearing 51, both of which are joined to the saddle 20. Z-axis movement of the column is thus controlled by activation of motor 48, which drives ball screw 44.

FIG. 2 shows saddle 20 and column 26 moved along the X-axis relative to workpiece 36 by means of a ball screw 50 and a complementary ball nut 52 attached to the saddle and engaging the ball screw 50. Ball screw 50 is aligned along the X-axis and rotatably supported between a motor 54 and bearing 56, both of which are supported by brackets 57 mounted upon the base 14. Thus, movement of the saddle 20 and column 26 along the X-axis is controlled by selected activation of motor 54, which drives ball screw 50. It is to be noted that workpiece 36 may be of such substantial size that precise movement of the workpiece during a machining operation cannot be achieved.

FIG. 3 shows recesses 20b and 20c formed in the underside of saddle 20 to respectively receive bearing packages 22 and 24 in close fitting relationship, so that the bearing packages substantially become part of the integral structure of saddle 20. The bearing packages may be retained within their respective recesses by screws or the like (not shown). Each of the bearing packages 22 and 24 is provided with load support bearings 58, which are in contact with one or the other of the horizontal load bearing surfaces 16a and 18a of ways 16 and 18, respectively. Thus, both load bearing surfaces 16a and 18a carry a substantial portion of the combined weight of saddle 20. Bearings 58 support the saddle 20 in spaced-apart relationship with the base 14, to allow the saddle to move freely along ways 16 and 18.

To trap saddle 20 upon ways 16 and 18, bearing packages 22 and 24 are additionally provided with bearings 60 which engage under-surfaces 16b and 18b of ways 16 and 18, respectively. To prevent lateral movement of saddle 20 and the structure carried thereby, bearing packages 22 are provided with bearings 62, in contact with thrust bearing surface 16c of way 16, and bearings 64, in contact with surface 16d of way 16. Bearing surface 16c is oriented at a selected angle to load bearing surface 16a, such as 90°, and takes up forces acting to move saddle 20 to the right, as viewed in FIG. 3. Similarly, bearing surface 16d takes up forces acting to move saddle 20 to the left, as viewed in FIG. 3.

Base 14 is supported upon a very solid, generally horizontal surface 66, such as the floor of a factory or other work area. Base 14 and ways 16 and 18 are respectively configured to provide a distance $d_1$ between the load bearing surface 16a and support surface 66, and a distance $d_2$ between the load bearing surface 18a and surface 66, where $d_1$ is significantly greater than $d_2$. For example, $d_1$ could be equal to 1.3 $d_2$. Base 14 comprises integral sections 14a, 14b, and 14c. Section 14a is the portion of the base which supports way 16, section 14c is the portion supporting way 18, and section 14b is an intermediate portion joining sections 14a and 14c. Section 14b has an upper face 14d which is angled or sloped downwardly from section 14a to section 14c, to solidly transmit forces therebetween.

FIG. 3 further shows saddle 20 having sections 20d and 20e. Section 20d comprises the portion of the saddle extending between the right-ward most bearings 58 on the way 16 and an imaginary vertical plane 68, and section 20e comprises the portion of the saddle extending between the left-ward most bearings 58 on the way 18 and the plane 68, as viewed in FIG. 3. Saddle section 20d has a width $w_1$, and saddle section 20e has a width $w_2$ which is substantially greater than $w_1$. For example, $w_2$ might be equal to 4.5 $w_1$. Saddle section 20d has a depth $d'_1$, comprising the vertical distance between the upper surface 20a of saddle 20 and the underside 20f of saddle section 20d. Saddle section 20e has a depth $d'_2$ comprising the vertical distance between upper surface 20a and the underside 20g of saddle section 20e, the depth $d'_2$ of section 20e being substantially greater than the depth $d'_1$ of section 20d. For example, $d'_2$ could be equal to 1.4 $d'_1$.

Undersides 20f and 20g comprise, depending on the construction of saddle 20, continuous horizontal surfaces or horizontal planes which include the bottom edges 70 of structural members 72 of saddle 20.

Members 72 comprise the lower structure of saddle 20 and surround pockets 74 formed in the underside of the saddle. Members 72 may be discrete members welded together, or alternatively may be integral portions of the saddle, if the saddle is formed by casting.

It will be realized that saddle 20 is most susceptible to bending by column 26 when the column is positioned above saddle section 20e, in a region midway between ways 16 and 18. By providing the saddle with its greater depth $d'_2$ throughout such region, the saddle is given the stiffness or rigidity required to prevent bending or deformation of the saddle, and thereby avoids significant spindle deflection during machining. When the column 26 is moved to a position above saddle section 20d, the force of its weight is mostly directed vertically downward onto the load bearing surface 16a of way 16 through bearings 58. Thus, the saddle section 20d can have the reduced depth $d_1'$, without diminishing the capability of the saddle to resist deformation.

As is well known, when column 26 is moved along ways 40 to perform a machining operation, a thrust force T is directed against the column 26, through the tool spindle 32 and spindle head 30, from the workpiece being machined. The thrust force T will be transferred from the column to the saddle 20, through the ways 40 and way bearing packages 42, to urge the saddle 20 to the right as viewed in FIG. 3. Virtually all of such thrust is taken up by thrust bearings 62, acting against surface 16c of way 16. Way 16 and base section 14a are respectively configured to establish a contact point between the thrust bearing surface 16c and thrust bearings 62 which is at a higher level above surface 66 than load bearing surface 18a of way 18. Such configuration causes the thrust force T acting against way bearing surface 16c to establish a moment upon base 14 which tends to rotate the base clockwise as viewed in FIG. 3, and against horizontal support surface 66. A downward force is thereby directed into surface 66 through every part of the base 14 in contact with the surface 66, the surface 66 solidly taking up all of such force. Thus, by elevating the bearing surface 16c of the forward way 16 above the bearing surface 18a of the rearward way 18, the thrust force T is distributed over the base and transmitted into the surface 66. At the same time, the depth of the rearward section 14c of base 14 can be decreased to accommodate the depth $d'_2$ of saddle section 20e, to enhance saddle stiffness.

What is claimed is:

1. In a machine tool, apparatus for movably supporting a work performing member, said apparatus comprising:

discrete first and second ways, each having a planar load bearing surface and said first way being located forward of said second way;

a base means for supporting the ways in spaced-apart parallel relationship with a first axis, and for maintaining the load bearing surfaces of the first and second ways in horizontal orientations at first and second levels, respectively, above a generally horizontal surface supporting the apparatus and work performing member, the first level being greater than the second level;

a saddle carrying the work performing member positioned for movement along the ways and connected to receive thrust forces directed against the member in the course of machining operations;

load bearing means joined to the saddle for transmitting a substantial portion of the combined weight of the saddle and work performing member to the load bearing surfaces of both the first and second ways; and means joined to the saddle for transmitting substantially more of said thrust forces received by the saddle to the first way than to the second way.

2. The apparatus of claim 1 wherein:
the first way is provided with a thrust bearing surface positioned at a selected angle to its load bearing surface; and
the thrust transmitting means comprises a set of thrust bearing and means for supporting the thrust bearings in contact with the thrust bearing surface to transmit thrust forces from the saddle to the thrust bearing surface of the first way.

3. The apparatus of claim 1 wherein:
the load bearing means comprises a set of first load bearings in contact with the load bearing surface of the first way, and a set of second load bearings in contact with the load bearing surface of the second way.

4. The apparatus of claim 3 wherein:
the saddle and the work performing member come together at a position included in a horizontal interface plane located at a selected level above said supporting surface and also above the load bearing surfaces of the first and second ways.

5. The apparatus of claim 4 wherein:
the base means comprises a base supporting the ways in spaced apart parallel relationship;
a portion of the saddle extending between the first and second ways is divided into first and second sections by an imaginary vertical plane positioned between the first and second sets of load bearings and extending through the saddle in parallel relationship with the ways, the vertical plane being located at a first distance from the first set of load bearings and at a second distance from the second set of load bearings which is greater than the first distance;
the first saddle section has an underside lying in a horizontal plane and a depth comprising the distance between the interface plane and the underside of the first saddle section; and
the second saddle section has an underside lying in a horizontal plane and a depth comprising the distance between the interface plane and the underside of the second saddle section, the depth of the second saddle section being greater than the depth of the first saddle section.

6. The apparatus of claim 5 wherein:
the second distance associated with the second saddle section has a value on the order of four and one-half times greater than the first distance associated with the first saddle section.

7. The apparatus of claim 3 wherein:
the base is in contact with said supporting surface and comprises a first integral base section supporting the first way, a second integral base section supporting the second way, and a third integral base section joining the first and second base sections together and configured to transmit thrust forces received by the first way from the first base section to the second base section.

8. The apparatus of claim 7 wherein:
the second base section has an upper side in opposing spaced-apart relationship with the underside of the second saddle section.

9. The apparatus of claim 3 wherein:
the work performing member comprises structure supporting a horizontal machine tool spindle.

10. The apparatus of claim 3 wherein:
the thrust bearings and first and second load bearings are included in bearing packages closely fitted into complementary recesses formed in the saddle.

11. In a machine too, apparatus for movably supporting a work performing member, said apparatus comprising:
first and second ways, each having a planar load bearing surface;
a base means for supporting the ways in spaced-apart parallel relationship with a first axis, and for maintaining the load bearing surfaces of the first and second ways in a horizontal orientation at first and second levels, respectively, above a generally horizontal surface supporting the apparatus and work performing member, the first level being greater than the second level;
a saddle carrying the work performing member positioned for movement along the ways to bring a workpiece and cutting tool into contact with each other to selectively machine the workpiece, a thrust force being directed against the member through the point of contact between the workpiece and cutting tool and the saddle being connected to receive said thrust force;
the base means further comprises means for supporting the ways to locate the first and second ways at forward and rearward positions, respectively, relative to said point of contact;
load bearing means joined to the saddle for transmitting a substantial portion of the combined weight of the saddle and work performing member to the load bearing surfaces of both the first and second ways; and
means joined to the saddle for selectively transmitting said thrust force received by the saddle to the ways.

12. The apparatus of claim 11 wherein:
the work performing member comprises a cutting tool and a tool holding structure, the thrust force being generally directed along the tool axis to the tool holding structure.

13. The apparatus of claim 12 wherein:
the thrust force transmitting means comprises means for transmitting substantially more of the thrust force received by the saddle to the first way than to the second way.

* * * * *